Patented June 25, 1946

2,402,562

UNITED STATES PATENT OFFICE 2,402,562

INDEPENDENTLY SPRUNG AXLE CONSTRUCTION

Robert P. Lewis, Toledo, Ohio, assignor to Spicer Manufacturing Corporation, Toledo, Ohio, a corporation of Virginia Application August 12, 1944, Serial No. 549,265

1 Claim. (Cl. 180—43)

This invention relates to independently-sprung driving axle constructions, and has for its object a strong, simple and compact wheel, spindle and bearing construction, and particularly drive axle constructions embodying steering knuckles.

The invention consists in the novel features and in the combinations and constructions hereinafter set forth and claimed.

In describing this invention, reference is had to the accompanying drawings, in which like characters designate corresponding parts in all the views.

Figure 1:
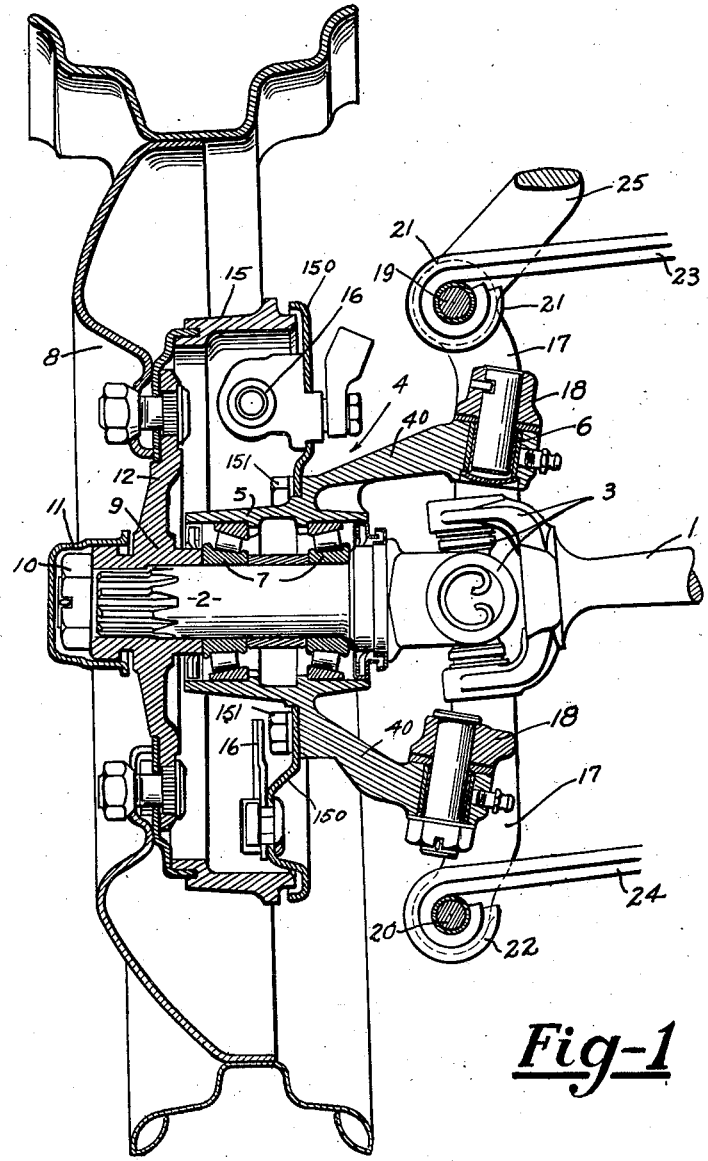
Figure 1 is a sectional view, parts being omitted, of this independently-sprung axle construction.
Figure 2:
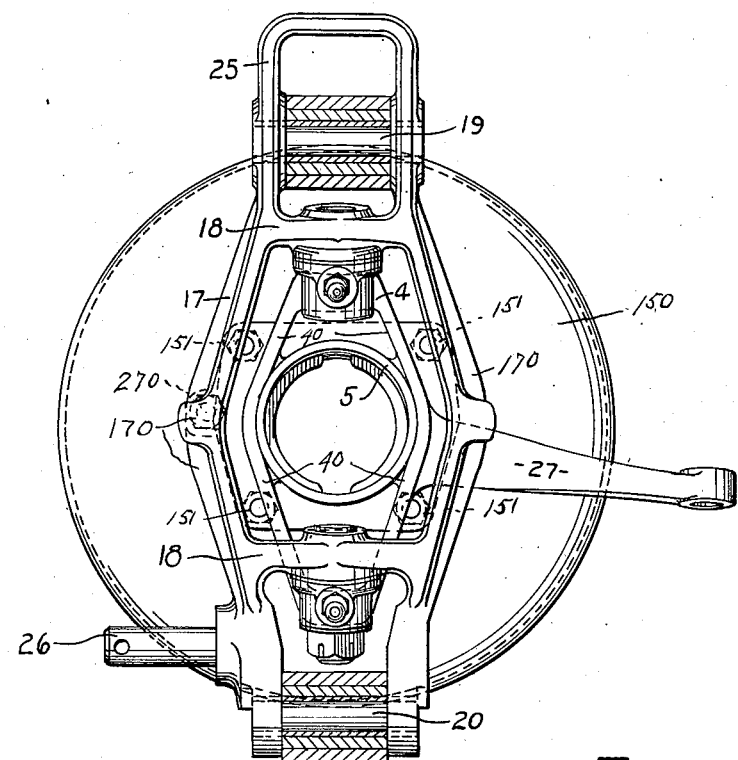
Figure 2 is an end elevation of the carrier and its supporting and guiding means, looking to the left in Figure 1.
Figure 3:
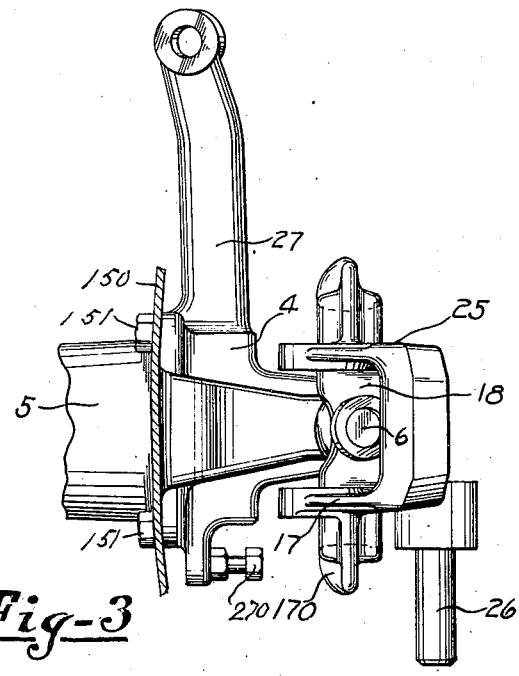
Figure 3 is a plan view partly in section of parts seen in Figure 2.

1 designates a drive shaft or section, and 2 the wheel spindle, which is connected to the shaft section by a universal joint 3 of any suitable construction.

4 designates a carrier for the spindle, this having a hub portion 5 concentric with the spindle 2 but spaced radially therefrom, and a base or yoke portion 40 which is connected to its support by king pins 6 forming part of the steering knuckle. 7 are bearings interposed between the hub 5 and the periphery of the spindle 2.

8 designates the vehicle wheel having a hub 9 mounted on the outer end of the spindle to rotate with the spindle 2, it being here shown as splined thereon. It is held in position, as by a nut 10 threading on the end of the spindle and preferably housed by a cap 11. The web of the wheel is secured to a flange 12 on the hub 9. A brake drum 15 is carried by the web of the wheel or by the flange 12 on the inner side thereof. The drum coacts with brake mechanism 16 of any suitable construction mounted on the cover plate for the brake drum 15. 150 designates the cover plate for the brake drum which is secured to the carrier 4 intermediate of the ends of the carrier by screw bolts 151.

17 designates the support for the carrier 4, this being in the form of a boxlike frame elongated in a vertical direction with the yoke portion 40 of the carrier extending between upright side portions 170 of the frame 17 and pivoted to cross bar portions 18 by the king pins 6. The portions of the framelike structure of the support 17 above and below the bars 18, carry spring bolts 19, 20 for receiving the eyes 21, 22 of upper and lower parallel leaf springs 23, 24. The support or mounting 17 at its upper end is in the form of a shackle 25 over the adjacent spring 23 for limiting the downward movement of the support 17.

The leaf springs 23, 24 are, as will be understood, anchored at their intermediate portions to a fixed point on the chassis or frame of the vehicle. The springs have an up and down movement during their operation, analogous to a parallel link movement. In so far as this invention is concerned, they merely perform the function of means for guiding the support 17 and the carrier 4 up and down in a substantially rectilinear movement. The support may be guided by additional means, as a link, not shown, pivoted at one end on a stud 26 on the support 17 and at its lower end to the chassis or body of the vehicle or to any other fixed point.

The upper cross bar 18 of the frame extends over the king pin bearing at the inner end of the upper yoke arm of the carrier 4 and the lower cross bar extends over the king pin bearing at the inner end of the lower yoke arm of the carrier 4. This results in equal distribution of the weight between the yoke arms.

The carrier 4, which in this embodiment of the invention, is movable about the axes of king pins to steer the vehicle, is provided with laterally extending arm 27 to which a link or rod is connected for transmitting the motion of the hand steering wheel of the vehicle to the steering knuckle. The turning of the wheel spindle support 4 is limited in one direction against one of the side bars 170 of the box-like frame of the support 17 and in the other direction by encountering an adjustable stop 270 on the other side bar 170 of the support 17.

What I claim is:

In an independently-sprung axle construction, a drive shaft, a wheel spindle connected by universal joint thereto, a carrier having a hub portion concentric with and spaced from the spindle, and yoke arms embracing the universal joint and spaced therefrom, a wheel mounted on the spindle, bearings between the hub and the spindle, a support for the carrier, king pins carried by the support and coacting with the yoke arms to provide a steering knuckle joint, means for mounting the support to have an up and down substantially rectilinear movement, means for turning the carrier about the axes of the king pins, said support being in the general form of an upright oblong boxlike frame having transverse bars located above and below the universal joint and midway between the center of the frame and the upper and lower ends thereof, the king pins being carried by the transverse bars, bolts mounted in the upper and lower portions of the boxlike frame between the transverse bars and the upper and lower ends of the oblong frame and the mounting means having bearings mounted on said bolts.

ROBERT P. LEWIS.